(12) United States Patent
Sharifi

(10) Patent No.: US 9,204,101 B1
(45) Date of Patent: Dec. 1, 2015

(54) VIDEO CHUNKING FOR ROBUST, PROGRESSIVE UPLOADING

(75) Inventor: Matthew Sharifi, Zurich (CH)

(73) Assignee: GOOGLE INC., Mountain View, CA (US)

(*) Notice: Subject to any disclaimer, the term of this patent is extended or adjusted under 35 U.S.C. 154(b) by 251 days.

(21) Appl. No.: 13/610,799

(22) Filed: Sep. 11, 2012

(51) Int. Cl.
*H04N 7/173* (2011.01)
*H04N 7/14* (2006.01)

(52) U.S. Cl.
CPC ............ *H04N 7/17318* (2013.01); *H04N 7/14* (2013.01); *H04N 7/173* (2013.01)

(58) Field of Classification Search
CPC .................................. H04N 5/76; G11B 27/34
USPC ................................................. 725/114, 116
See application file for complete search history.

(56) References Cited

U.S. PATENT DOCUMENTS 8,488,943 B1 * 7/2013 Sharifi ........................ 386/282
2011/0239078 A1 * 9/2011 Luby et al. ................... 714/752

* cited by examiner

*Primary Examiner* — Kieu Oanh T Bui
(74) *Attorney, Agent, or Firm* — Fenwick & West LLP

(57) ABSTRACT

Systems and methods are provided herein relating to video chunking for robust, progressive upload. Video can be parsed to determined byte offsets associated with prospective chunk boundaries. Chunks can be generated based on the prospective chunk boundaries and a preferred chunk size. Sample tables can be generated for each chunk. The chunks can be fully self contained, in that they can be received and transcoded independently of other chunks. Thus, if one chunk fails, only that chunk needs to be retransmitted versus the entire video.

20 Claims, 11 Drawing Sheets

VIDEO CHUNKING FOR ROBUST, PROGRESSIVE UPLOADING

TECHNICAL FIELD

This application relates to media sharing services and more particularly to chunking video for robust, progressive uploading to a media sharing service.

BACKGROUND

Media sharing services have become prolific on the internet as connection speeds have increased giving consumers the ability to upload, for example, their own personal videos. Most media sharing services act strictly as an intermediary, for example, they give the user a forum to display the user's version of a video. The media sharing service can then host the user uploaded media allowing other users on the internet the ability to view the uploaded media.

Many mobile devices, such as smart phones, tablets, e-readers, laptops, etc., have cameras that support video capture. For example, a camera on a smart phone can be used by a user of the phone to record a personal video. Video quality associated with mobile devices has improved dramatically and mobile devices can be a real alternative to using a standalone camera. When a user of a mobile device records a video, they may have the option to upload the video directly from their mobile device to a media sharing service. However, uploading a video file from a mobile device to a media sharing service can be problematic for large, high bit rate videos, because the mobile networks through which the videos may be transmitted can be unreliable or slow.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to video chunking and transmission. In one implementation, a device can contain a receiving component that can receive video sample. A parsing component can parse the video sample to determine chunk boundaries and a byte offset associated with respective chunk boundaries. A chunking component can generate a set of chunks based on chunk boundaries, the byte offset associated with respective chunk boundaries, and a preferred chunk size wherein chunks in the set of chunks are self contained.

In addition, in another implementation, the device can further contain a sample table component that can generate a set of sample tables for respective chunks among the set of chunks based on sample tables associated with the video sample. A packing component can pack respective chunks among the set of chunks and associated sample tables into respective subcontainers. A transmission component can then transmit respective subcontainers to a media sharing service wherein respective subcontainers are sent separately.

In another implementation a media sharing service can dynamically receive, from a device, video subcontainers among a set of video subcontainers and sample tables associated with video subcontainers. A transcoding component can dynamically transcode video subcontainers among the set of video subcontainers upon receipt in entirety of the video subcontainer and associated sample tables. For example, in one implementation, the transcoded format can be 3GP or MP4. A display component can make transcoded video subcontainers available for display, upon completion of transcoding.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
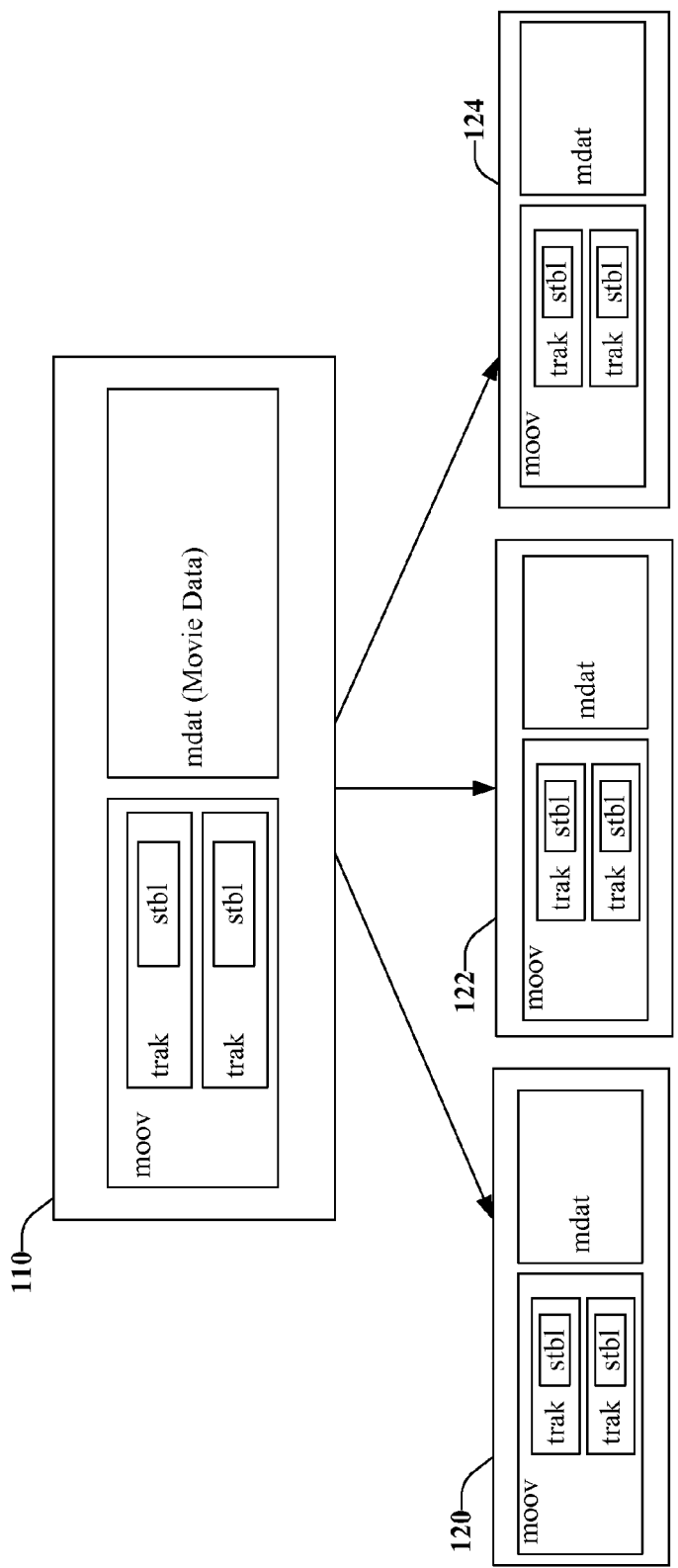
FIG. 1 illustrates an example video being broken down into chunks in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can decide whether they will provide personal information, demographic information, location information, proprietary information, sensitive information, or the like in connection with data gathering aspects. Moreover, one or more implementations described herein can provide for anonymizing collected, received, or transmitted data.

Many mobile devices, such as smart phones, tablets, e-readers, laptops, etc., have cameras that support video capture. For example, a camera on a smart phone can be used by a user of the phone to record a personal video. Video quality associated with mobile devices has improved dramatically and mobile devices can be a real alternative to using a standalone camera. When a user of a mobile device records a video, they may have the option to upload the video directly from their mobile device to a media sharing service. However, uploading a video file from a mobile device to a media sharing service can be problematic for large, high bit rate videos, because the mobile networks through which the videos may be transmitted can be unreliable or slow.

Systems and methods are provided herein relating to video chunking for robust, progressive upload. Video can be parsed to determined byte offsets associated with prospective chunk boundaries. Chunks can be generated based on the prospective chunk boundaries and a preferred chunk size. Sample tables can be generated for each chunk. Each of the chunks can have their own set of headers and act as a stand alone video file. In this sense, the chunks can be fully self contained and thus they can be received and transcoded independently of other chunks. Multiple chunks can be transmitted, received, and transcoded in parallel.

In an example, a user of mobile device can record a video directly on their mobile device. The mobile device can give the user an option to upload the video directly from the mobile device to a media sharing service. The user of the mobile device can authorize the program to upload the video. The mobile device, at this point, could be connected to the media sharing service via an internet connection. Mobile devices can have very different connection speeds depending on the service options for the device e.g., 3G, LTE, 4G, Wi-Fi, etc. Not only can connection speeds vary, the user can be mobile and may switch back and forth between service options as the device changes locations. Using the systems and methods provided herein, the video can be divided into a number of self contained chunks which can be uploaded separately and in some implementations simultaneously. The chunks can then be pieced together and transcoded independently of other chunks being received, by, for example, the server of the media sharing service. Thus, if one chunk fails, only the failed chunk needs to be retransmitted versus the entire video. Furthermore, as the chunks are self contained, individual chunks can be transcoded prior to receiving all the remaining chunks of the entire video. This can speed up transcoding time over a system that does not use self contained chunks and must wait to receive all the chunks related to the entire video before beginning transcoding.

Referring now to FIG. 1, there is illustrated an example video being broken down into chunks in accordance with implementations of this disclosure. A full self contained video file 110 with associated movie data, headers, and sample tables, can be split into self contained chunks 120, 122, and 124. It can be appreciated that chunks can be generated based on a preferred chunk size, and existing chunk boundaries within movie 110. Thus, there can be more or less than the three depicted chunks for an entire video, and video 110 could conceivably be broken down into N chunks where N is an integer. It can be further appreciated that by using existing chunk boundaries within the movie, the chunking algorithm can be very lightweight in that it requires no decoding or re-encoding of the audio or video content of the video in breaking the video into chunks.

For example, the sample table sync tables in video 110 can be examined to determine existing potential chunk boundaries inherent in the full video. Using a preferred chunk size, systems and methods herein can iterate through the byte offset mapping to determine whether the current potential chuck boundaries minus the previous potential chunk boundary is greater than or equal to the preferred chunk size. Once this parameter is met, a chunk can be generated that comes as close in size to the preferred chunk size based on the inherent properties of the vide file 110.

By generating chunks using existing chunk boundaries, it can be ensured that each chunk can be self contained. The self contained chunks, or video subcontainers, 120, 122, and 124, can contain sample tables related to both audio and video. It can be appreciated that the process to generate chunks can happen independently using both audio and video offsets. It can be appreciated that by generating self contained chunks, multiple self contained chunks can be transmitted, received, and transcoded in parallel by a media sharing service. As self contained chunks are received and transcoded, they can be made available for viewing prior to receipt of related self contained chunks. In another example, chunk boundaries can be determined for the video based on stss entries. All audio bytes between the video chunk boundaries can be then be copied.

In another implementation, a summarization of the entire video, based on the chunks, can be generated. The summarization can identify and split out the I-frames related to the boundaries of the chunks, as well as audio for the entire video. It can be appreciated that in general the audio component for high definition video will be a small fraction of the total file size. Using the I-frames within the summarization, previews of each chunk showing the I-frame and corresponding audio could be made available after receipt of just the summarization. Self contained chunks including video data and sample tables can then be generated and transmitted to, for example a media sharing service. After self contained chunks are received in their entirety and transcoded, the transcoded video can be incorporated into the sections of the video marked by the I-frame and audio. It can be appreciated that transcoded sections can be made available for viewing individually prior to receipt and transcoding of every chunk of the video.

Figure 2:
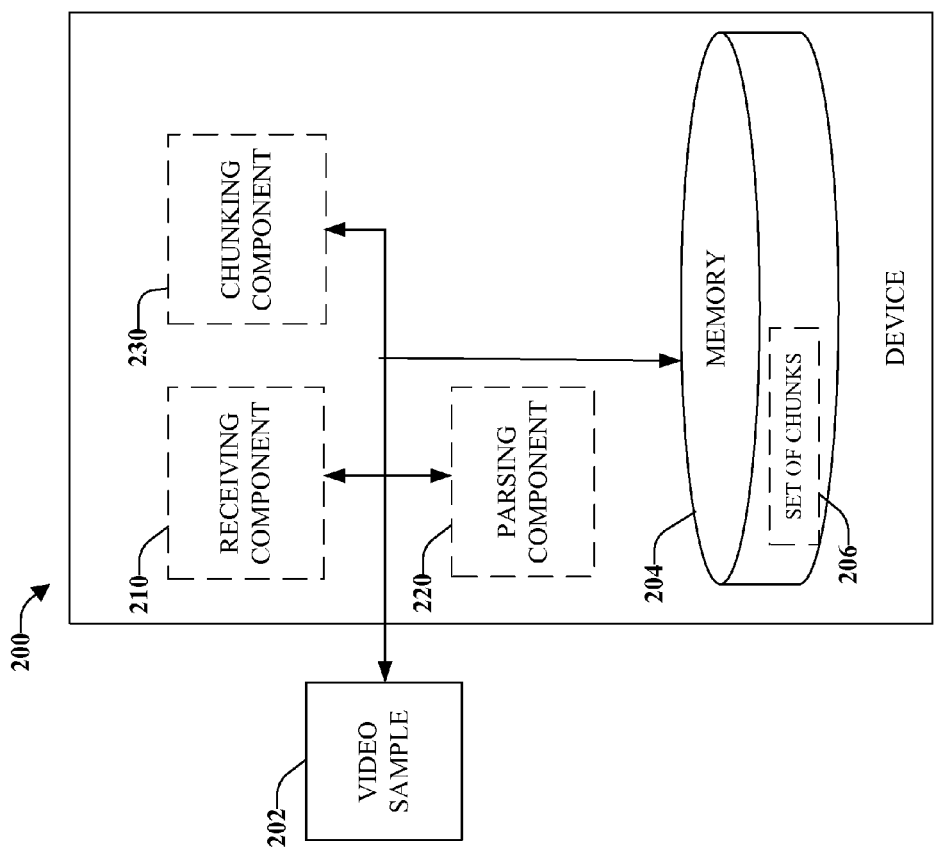
FIG. 2 illustrates an example high-level block diagram of an example device that can divide video into chunks in accordance with implementations of this disclosure.

Referring now to FIG. 2, there is illustrated an example high-level block diagram of an example device that can divide video into chunks in accordance with implementations of this disclosure. In FIG. 2, a device 200 includes a receiving component 210, a parsing component 220, a chunking component 230, and a memory 204, each of which may be coupled as illustrated. Examples of a device can include a smart phone, a tablet, an e-reader, a laptop computer, a desktop computer, etc. Receiving component 210 can receive a video sample 202. For example, the video sample could be captured via a camera of the device, downloaded from a network by the device, transferred to the device from a different device, etc. It can be appreciated that video sample 202 can be stored within device memory 204. In one implementation, the video sample can be formatted using the MP4 standard.

Parsing component 220 can parse the video sample to determine chunk boundaries and a byte offset associated with respective chunk boundaries. In one implementation, parsing component 220 can further parse atoms of the video sample to determine chunk boundaries. For example, parsing component 220 can parse the stbl atoms for both audio and video channels of the video sample. One example of a stbl atom is the Sample Table Sync Samples ("stss") atom from the video layer, as the stss atom will act as the chunk boundaries to ensure that each chunk is self contained. Entries in the stss atom can be converted to a byte offset using the Sample Table Chunk Offset ("stco") atom, the Sample Table Sizes ("stsz") atom, and the Sample Table Sample to Chunk Map ("stsc") atom. It can be appreciated that parsing component 220 can identify existing chunk boundaries within the video that can be used to generate chunks without necessitating decoding or re-encoding of the audio or video content. In this sense, device 200 does not need to the computational power to decode or re-encode audio and video content, which can be a computational taxing process.

Chunking component 230 can generate a set of chunks based on chunk boundaries, the byte offset associated with respective chunk boundaries, and a preferred chunk size wherein chunks in the set of chunks are self contained. The set of chunks 206 can be stored within memory 204 for access by other components. Chunking component 230 can iterate through the byte offset mapping to determine when the current chunk offset less the previous chunk offset is greater than or equal to the preferred chunk size. If so, the chunk boundary can be used to generate a chunk. It can be appreciated that for the audio layer, all samples that lie between the previous chunk offset and the current chunk offset can be included. It can be appreciated that for some implementations, chunks can be either constant in size, or a constant number per video sample. Each chunk boundary identified by parsing component 220 need not be used as a boundary between chunks generated by chunking component 230, as chunk boundaries can be selected based on the preferred chunk size.

In an example, the preferred chunk size can be 10000 bytes, and chunk boundaries can exist, as determined by parsing component 220, at [0, 6500, 8500, 12000], with the boundary at byte 0 is the previous chunk offset. Iterating through the next chunk boundary of 6500, 6500 bytes minus 0 bytes is less than the preferred chunk size of 10000 bytes, so iteration can proceed. Iterating through the next chunk boundary of 8500, 8500 bytes minus 0 bytes is less than the preferred chunk size of 10000 bytes, so iteration can proceed. Iterating through the next chunk boundary of 12000, 12000 is greater than the preferred chunk size of 10000, thus the chunk boundary at byte offset 12000 can be used to generate a chunk. This process can repeat through subsequent parts of the video until the entirety of the video is chunked.

Figure 3:
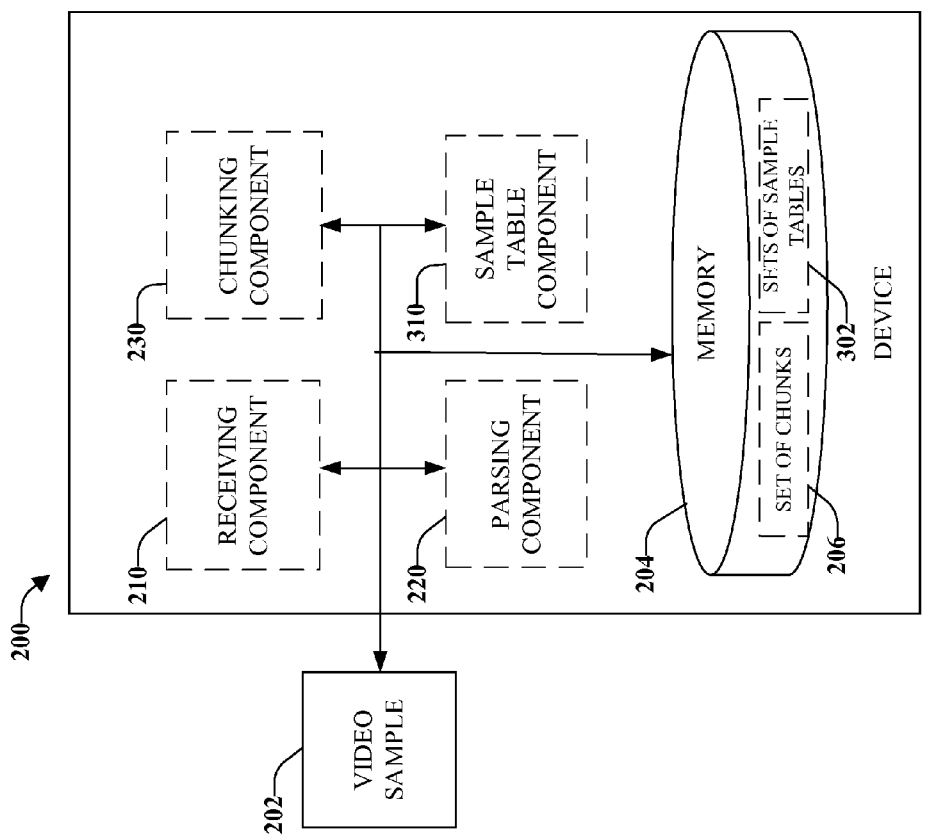
FIG. 3 illustrates an example high-level block diagram of an example device that can divide video into chunks including a sample table component in accordance with implementations of this disclosure.

Referring now to FIG. 3 there is illustrated an example high-level block diagram of an example device that can divide video into chunks including a sample table component in accordance with implementations of this disclosure. A sample table component 310, can generate a set of sample tables for respective chunks among the set of chunks based on sample tables associated with the video sample. It can be appreciated that by generating a set of sample tables for respective chunks, each chunk can be self contained, in that sample tables related to the chunk can be sent along with the chunk to a server of the media sharing service which can be used to transcode the chunk independently from other chunks. It can further be appreciated that the sets of sample tables 302 can be stored within memory 204.

In one implementation, sample table component 310 can generate the set of sample tables for respective chunks by copying a set of byte ranges from a Media Data ("mdat") atom associated with the video sample into a new mdat atom associated with the chunk.

In another implementation, sample table component 310 can generate the set of sample tables for respective chunks by updating chunk offsets in the stco atom associated with the chunk. In another implementation, sample table component 310 can generate the set of sample tables for respective chunks by splitting the stco atom. Parsing component 220 can associate the byte offset with respective chunk boundaries based on the sync sample table atom.

Figure 4:
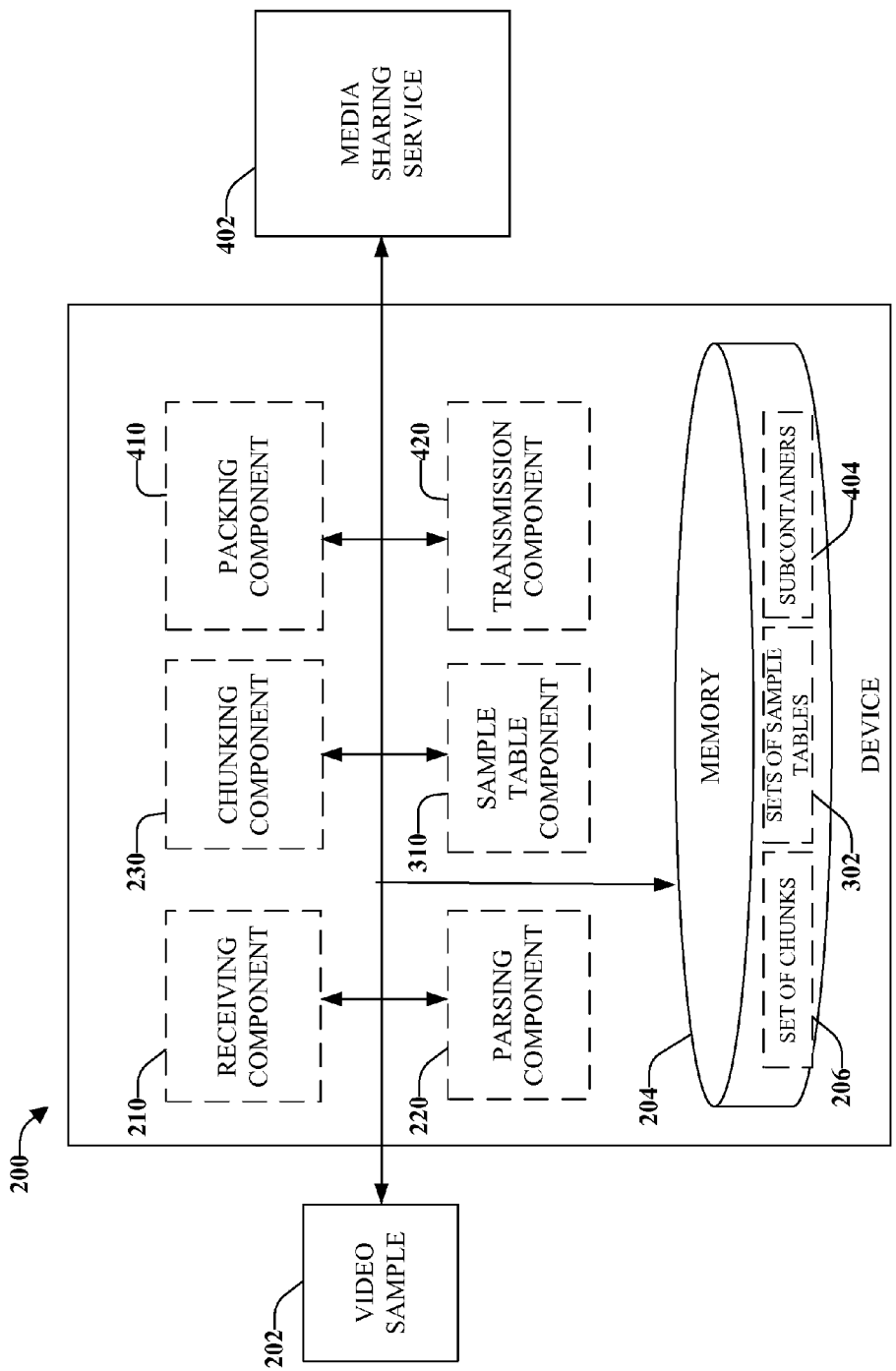
FIG. 4 illustrates an example high-level block diagram of an example device that can divide video into chunks including packing and transmission components in accordance with implementations of this disclosure.

Referring now to FIG. 4 illustrated an example high-level block diagram of an example device that can divide video into chunks including packing and transmission components in accordance with implementations of this disclosure. Packing component 410 can pack respective chunks among the set of chunks and associated sample tables into respective subcontainers. It can be appreciated that subcontainers 404 can be stored within memory 204 for access by other components.

Transmission component 420 can transmit respective subcontainers to a media sharing service 402 wherein respective subcontainers are sent separately. In one implementation, transmission component 420 can transmit at least two subcontainers simultaneously. In one implementation, transmission component 420 can resend a subcontainer upon receipt by receiving component 210 of a notice of failed subcontainer transmission associated with the subcontainer from the media sharing service. For example, if there was an error during transmission or receipt of the subcontainer, the media sharing service can alert device 200 of the error; which upon receipt of that alert, transmission component can resend the subcontainer in question.

Figure 5:
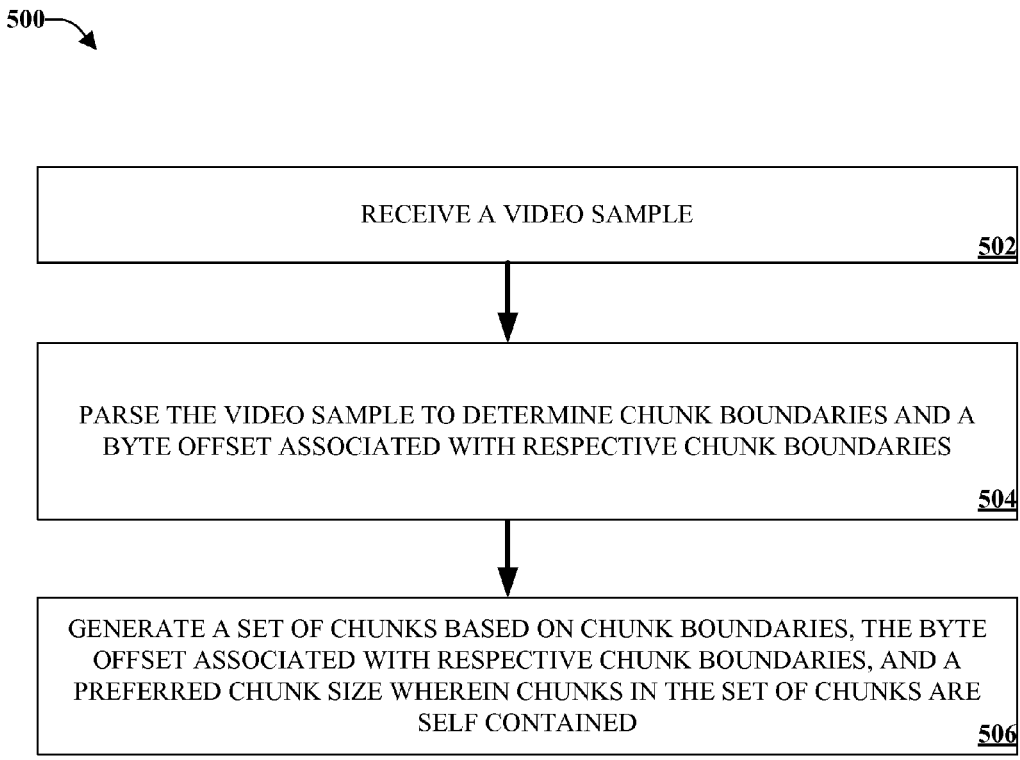
FIG. 5 illustrates an example flow diagram method for dividing video into chunks in accordance with implementations of this disclosure.
Figure 6:
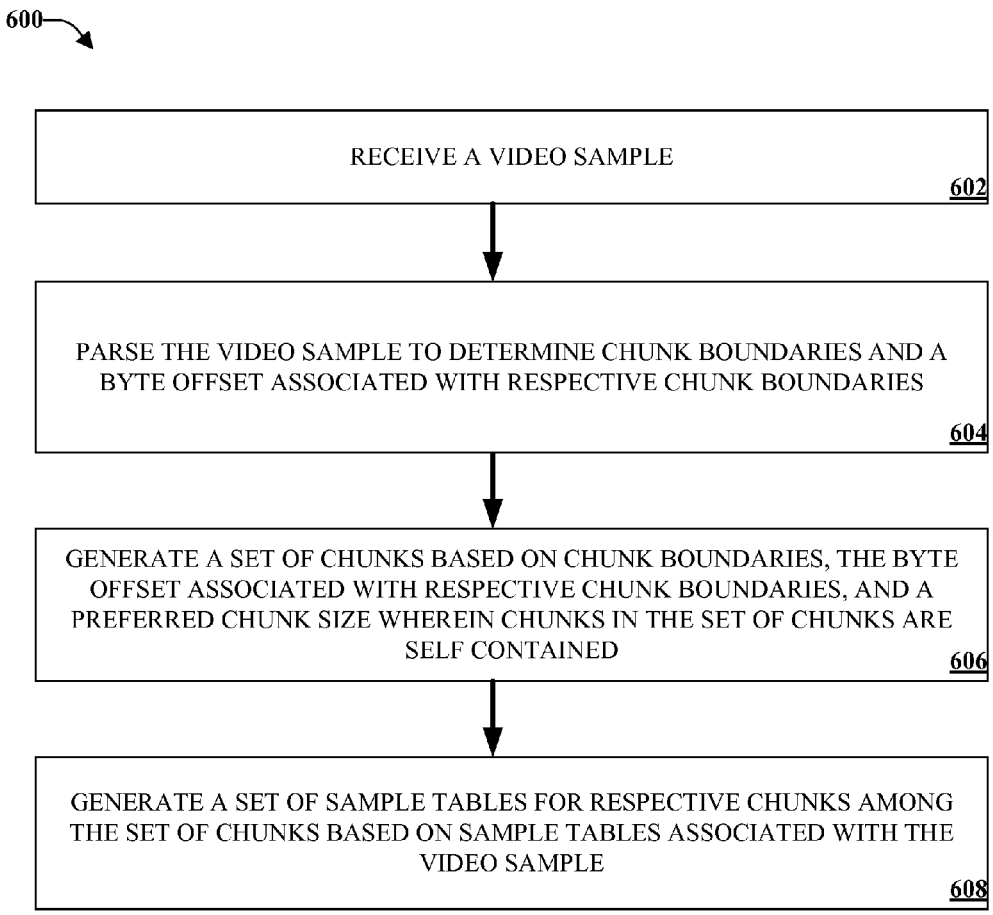
FIG. 6 illustrates an example flow diagram method for dividing video into chunks including generating sample tables in accordance with implementations of this disclosure.
Figure 7:
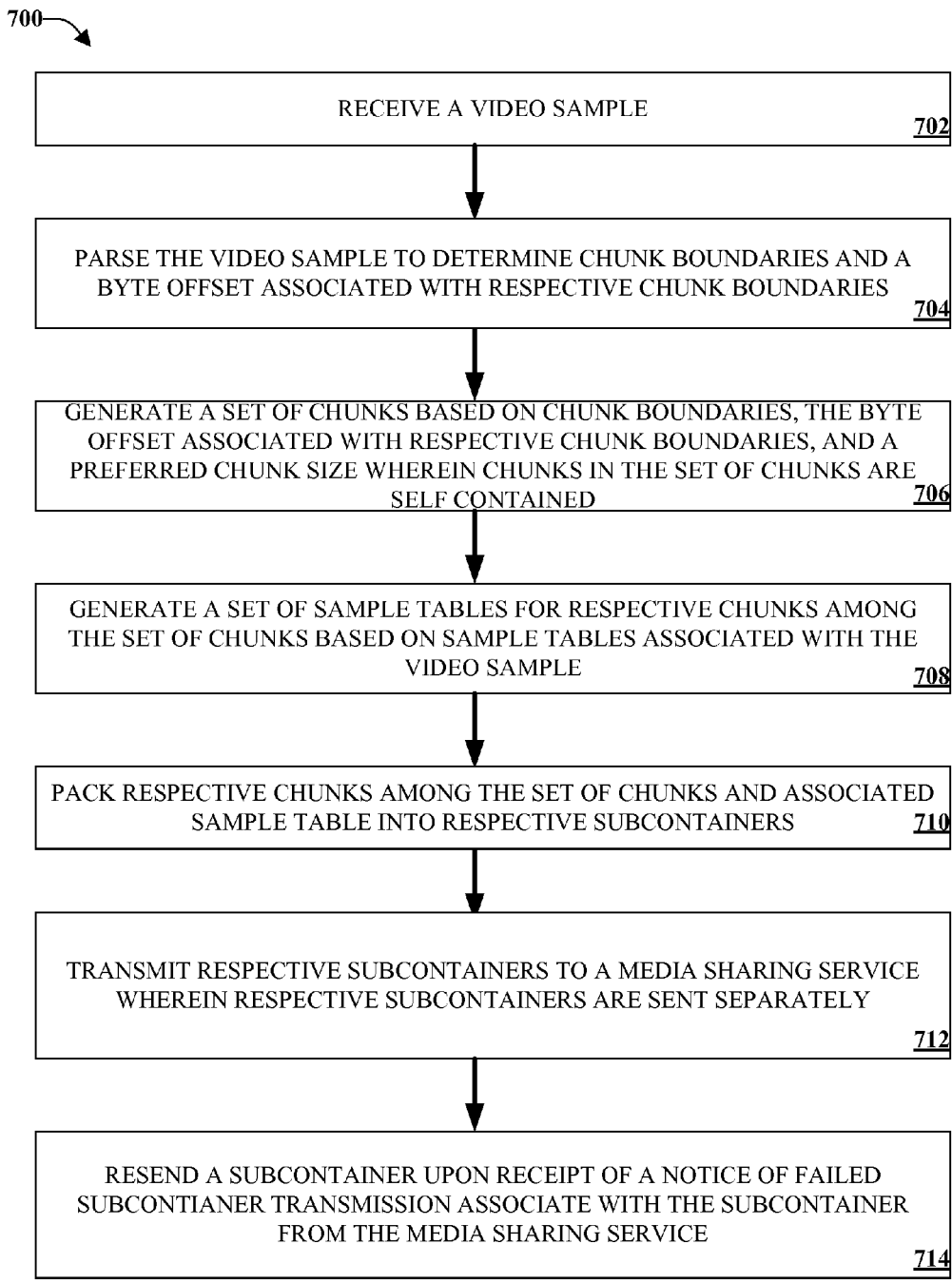
FIG. 7 illustrates an example flow diagram method for dividing video into chunks including transmitting the chunks index in accordance with implementations of this disclosure.

FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

Referring now to FIG. 5, there is illustrated an example flow diagram method for dividing video into chunks in accordance with implementations of this disclosure. At 502, a video sample can be received (e.g., by a receiving component). At 504, the video sample can be parsed (e.g., by a parsing component) to determine chunk boundaries and a byte offset associated with respective chunk boundaries. In one implementation, parsing the video sample to determine chunk boundaries can be based on atoms of the video sample. At 506, a set of chunks can be generated (e.g., by a chunking component) based on chunk boundaries, the byte offset associated with respective chunk boundaries, and a preferred chunk size wherein chunks in the set of chunks are self contained.

Referring now to FIG. 6, there is illustrated an example flow diagram method for dividing video into chunks including generating sample tables in accordance with implementations of this disclosure. At 602, a video sample can be received (e.g., by a receiving component). At 604, the video sample can be parsed (e.g., by a parsing component) to determine chunk boundaries and a byte offset associated with respective chunk boundaries. At 606, a set of chunks can be generated (e.g., by a chunking component) based on chunk boundaries, the byte offset associated with respective chunk boundaries, and a preferred chunk size wherein chunks in the set of chunks are self contained.

At 608, a set of sample tables can be generated (e.g., by a sample table component) for respective chunks among the set of chunks based on sample tables associated with the video sample. In one implementation the video sample can be formatted using the MP4 format. Furthermore, the set of sample tables can be generated for respective chunks by copying a set of byte ranges from a mdat atom associated with the video sample into a new mdat atom associated with the chunk.

In another implementation, the set of sample tables can be generated for respective chunks by updating chunk offsets in a stco atom associated with the chunk. The byte offset associated with respective chunk boundaries can be based on the sync sample table atom. In another implementation, the set of sample tables can be generated for respective chunks by splitting the stco atom associated with the chunk.

Referring now to FIG. 7, there is illustrated an example flow diagram method for dividing video into chunks including transmitting the chunks index in accordance with implementations of this disclosure. At 702, a video sample can be received (e.g., by a receiving component). At 704, the video sample can be parsed (e.g., by a parsing component) to determine chunk boundaries and a byte offset associated with respective chunk boundaries. At 706, a set of chunks can be generated (e.g., by a chunking component) based on chunk boundaries, the byte offset associated with respective chunk boundaries, and a preferred chunk size wherein chunks in the set of chunks are self contained. At 708, a set of sample tables can be generated (e.g., by a sample table component) for respective chunks among the set of chunks based on sample tables associated with the video sample.

At 710, respective chunks among the set of chunks and associated sample table can be packed (e.g., by a packing component) into respective subcontainers. At 712, respective subcontainers can be transmitted (e.g., by a transmission component) to a media sharing service wherein respective subcontainers are sent separately. In one implementation, at least two subcontainers can be transmitted simultaneously. At 714, a subcontainer can be resent (e.g., by a transmission component) upon receipt (e.g., by a receiving component) of a notice of failed subcontainer transmission associated with the subcontainer from the media sharing service.

Figure 8:
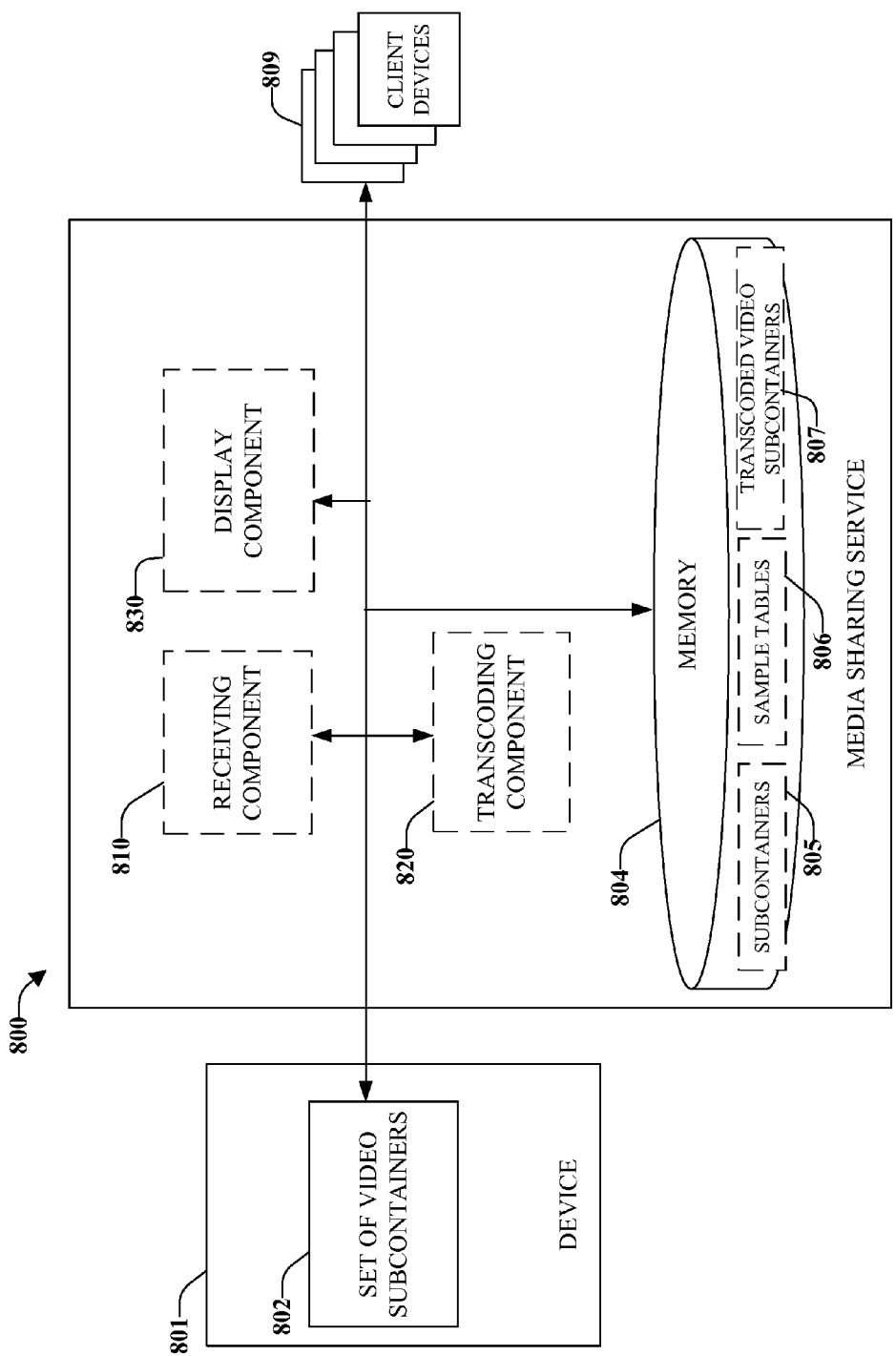
FIG. 8 illustrates an example high-level block diagram of an example media sharing service that can receive chunked video in accordance with implementations of this disclosure.

Referring now to FIG. 8, there is illustrated an example high-level block diagram of an example media sharing service that can receive chunked video in accordance with implementations of this disclosure. In FIG. 8, media sharing service 800 includes a receiving component 810, a transmission component 820, a display component 830, and a memory 804, each of which may be coupled as illustrated. Receiving component 810 can dynamically receive, from a device 801, video subcontainers among a set of video subcontainers 802 and sample tables associated with respective video subcontainers. Received subcontainers 805 and sample table 806 can be stored within memory 804 for access by other components.

Transcoding component 820 can dynamically transcode video subcontainers among the set of video subcontainers upon receipt in entirety of the video subcontainer and associated sample tables. Transcoded video subcontainers 807 can be stored within memory 804 for access by other components. Display component 830 can make transcoded video subcontainers available for display, upon competition of transcoding. It can be appreciated that client devices 809 can be in communication with media sharing service 800 to receive transcoded video subcontainers from media sharing service 800 for display. It can be further appreciated that as individual subcontainers and associated sample tables are received in their entirety and transcoded, they can be made ready for display by display component 830 prior to receiving or transcoding related subcontainers from device 801. Thus, in one implementation, transcoding component 820 can dynamically transcode video subcontainers among the set of video subcontainers prior to receipt of all video subcontainers among the set of video subcontainers.

Figure 9:
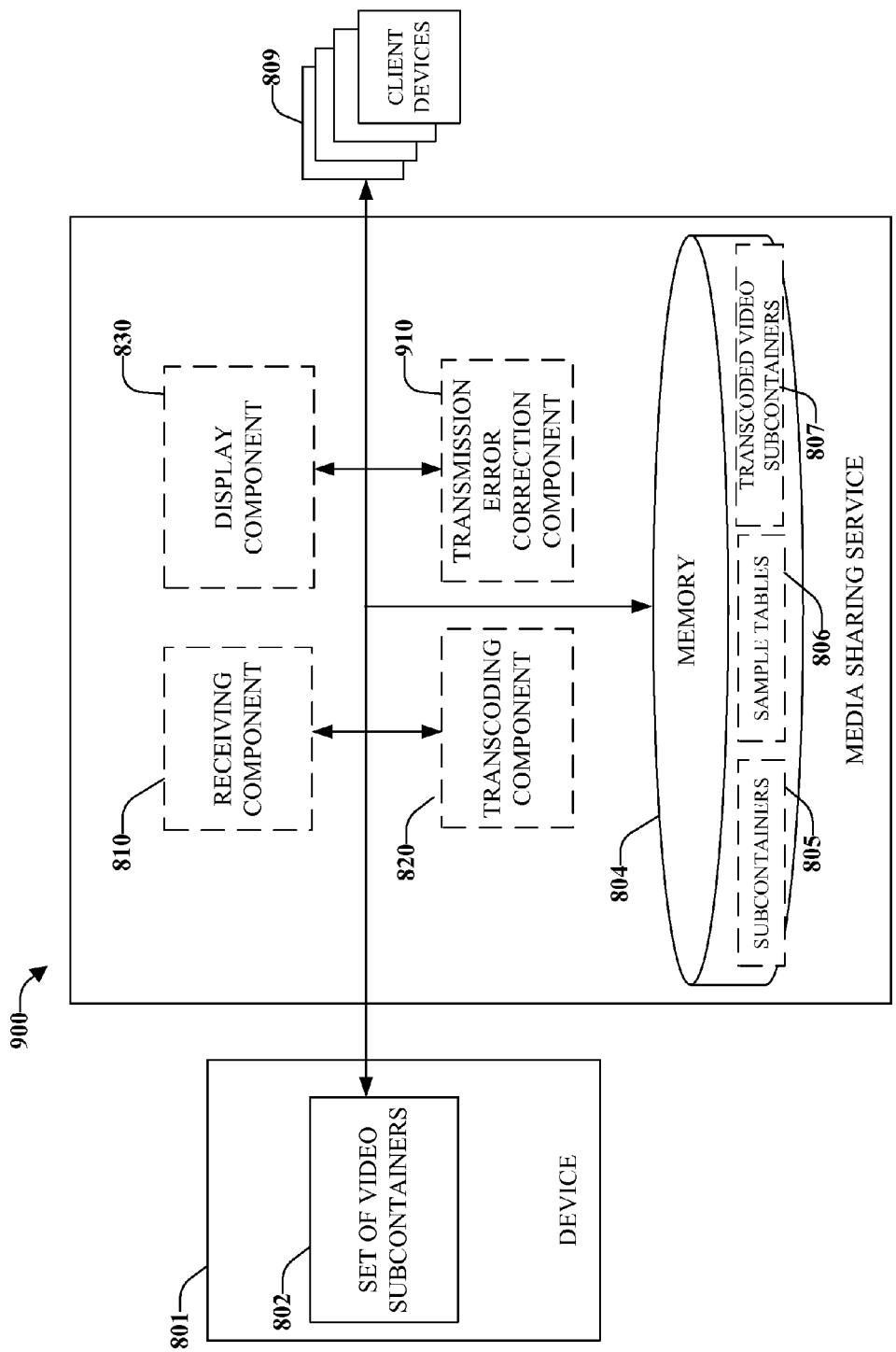
FIG. 9 illustrates an example high-level block diagram of an example media sharing service that can receive chunked video including a transmission error correction component in accordance with implementations of this disclosure.

Referring now to FIG. 9, there is illustrated an example high-level block diagram of an example media sharing service that can receive chunked video including a transmission error correction component in accordance with implementations of this disclosure. Transmission error correction component 910 can send a notice of failed subcontainer transmission to the device upon a failure by the receiving component 810 in dynamically receiving a video subcontainer among the set of video containers. For example, if in receiving a subcontainer transmission, a part of the transmission is cut off, or a part of the transmission encountered any other error during receipt, transmission error correction component 910 can notify the device that sent the subcontainer that there was an error during transmission. In response to the notice, the device can attempt to retransmit the subcontainer to the media sharing service. In one implementation, receiving component 810 can reattempt to receive the video subcontainer among the set of video subcontainers associated with the notice of failed subcontainer transmission.

As used herein, "video" may refer to visual content alone, or both audio and visual content, as will be understood based on context. Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
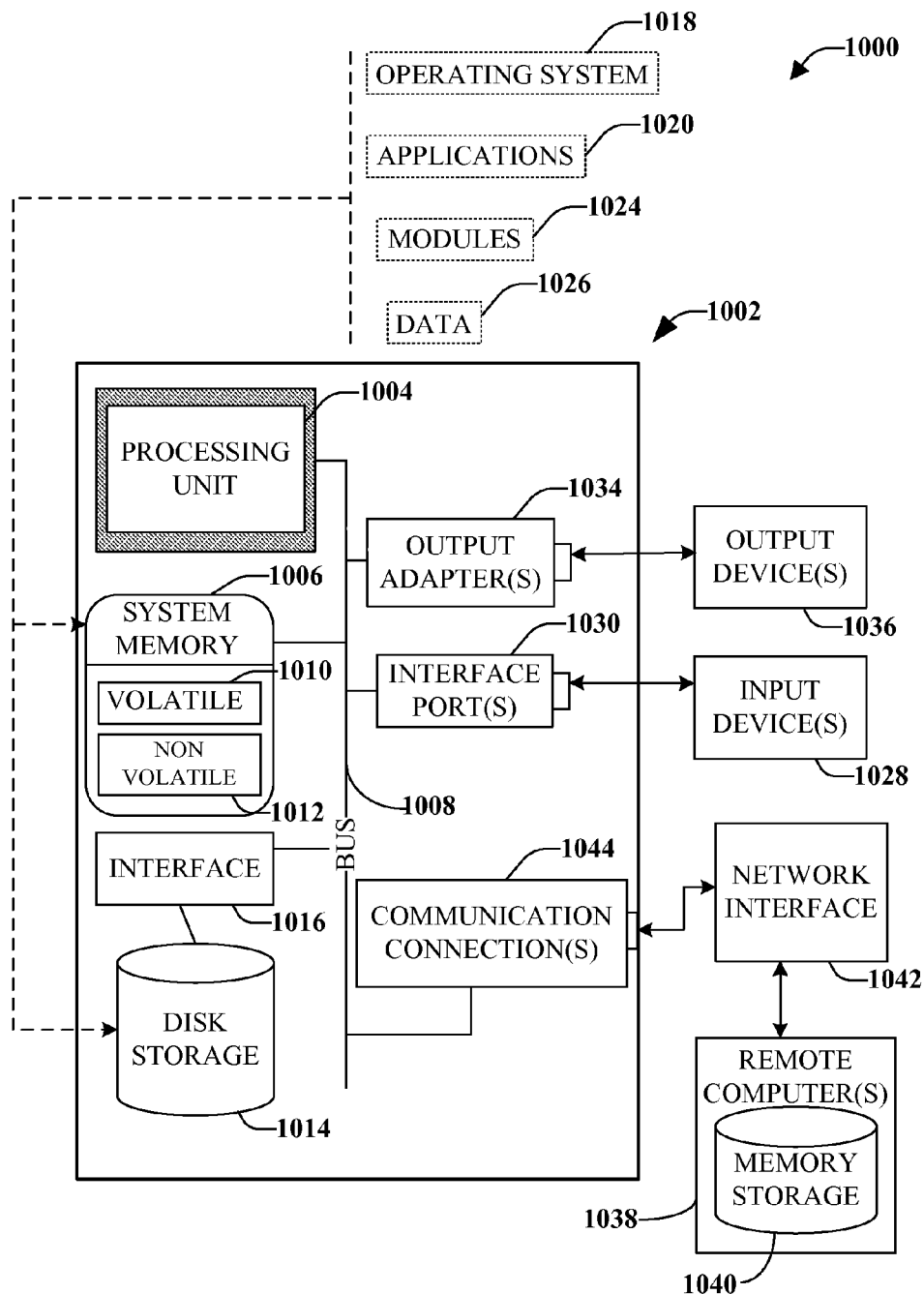
FIG. 10 illustrates an example block diagram of a computer operable to execute the disclosed architecture in accordance with implementations of this disclosure.

With reference to FIG. 10, a suitable environment 1000 for implementing various aspects of the claimed subject matter includes a computer 1002. It is to be appreciated that the computer 1002 can be used in connection with implementing one or more of the systems or components shown and described in connection with FIGS. 1-6. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036.

Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
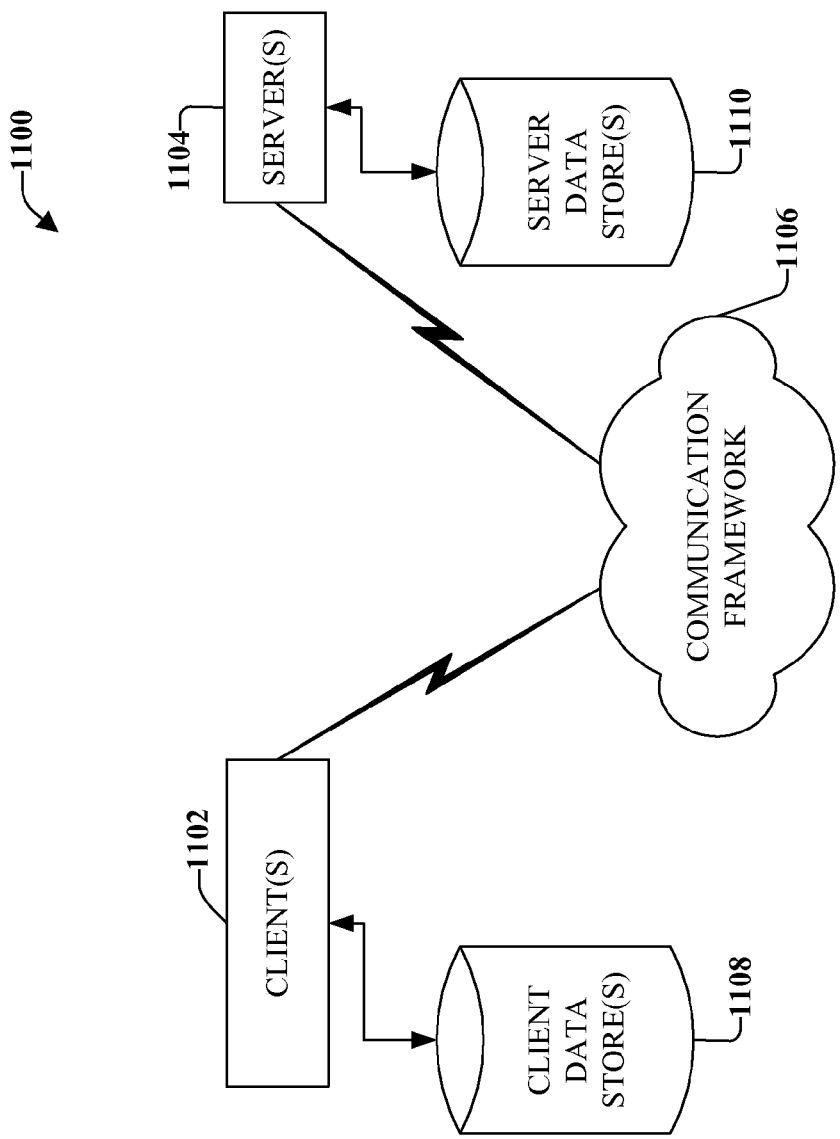
FIG. 11 illustrates an example schematic block diagram for a computing environment in accordance with implementations of this disclosure.

Referring now to FIG. 11, there is illustrated a schematic block diagram of a computing environment 1100 in accordance with the subject specification. The system 1100 includes one or more client(s) 1102, which can include an application or a system (e.g., a device) that accesses a service on the server 1104. The client(s) 1102 can be hardware and/or software (e.g., threads, processes, computing devices). The client(s) 1102 can house cookie(s), metadata, and/or associated contextual information. The client can house threads to perform, for example, receiving a video sample, parsing a video sample, generating chunks, generating sample tables, packing subcontainers, transmitting subcontainers, etc. in accordance with the subject disclosure.

The system 1100 also includes one or more server(s) 1104. The server(s) 1104 can also be hardware or hardware in combination with software (e.g., threads, processes, computing devices, media sharing systems). The servers 1104 can house threads to perform, for example, receiving subcontainers, transcoding subcontainers, transmitting notices, etc. in accordance with the subject disclosure. One possible communication between a client 1102 and a server 1104 can be in the form of a data packet adapted to be transmitted between two or more computer processes where the data packet contains, for example, portions of a video stream. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present innovations. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A device comprising:
   a memory that has stored thereon computer executable components; and
   a processor that executes the following computer executable components stored in the memory:
   a receiving component that receives a video sample;
   a parsing component that parses the video sample to determine chunk boundaries and respective byte offsets associated with the chunk boundaries;

a chunking component that generates a set of chunks based on the chunk boundaries, the respective byte offsets, and a preferred chunk size wherein chunks in the set of chunks are self contained;

a sample table component that generates a set of sample tables for respective chunks among the set of chunks based on sample tables associated with the video sample;

a packing component that packs respective chunks among the set of chunks and associated sample tables into subcontainers; and a transmission component that transmits respective subcontainers to a media sharing service separately.

2. The device of claim 1, wherein the parsing component further parses atoms of the video sample to determine the chunk boundaries.

3. The device of claim 1, wherein the video sample is formatted using the MP4 format.

4. The device of claim 3, wherein the sample table component generates the set of sample tables for respective chunks by copying a set of byte ranges from a mdat atom associated with the video sample into a new mdat atom associated with at least one chunk.

5. The device of claim 1, wherein the sample table component generates the set of sample tables for respective chunks by at least one of updating chunk offsets in a stco atom associated with the chunks or splitting the stco atom.

6. The device of claim 5, wherein the parsing component associates the respective byte offsets with the chunk boundaries based on the sync sample table atom.

7. The device of claim 1, wherein the transmission component transmits at least two subcontainers simultaneously.

8. The device of claim 1, wherein the transmission component resends a subcontainer upon receipt by receiving component of a notice of failed subcontainer transmission associated with the subcontainer from the media sharing service.

9. A method comprising:

receiving, by a system including a processor, a video sample;

parsing, by the system, the video sample to determine chunk boundaries and respective byte offsets associated with the chunk boundaries; and generating, by the system, a set of chunks based on the chunk boundaries, the respective byte offsets, and a preferred chunk size, wherein chunks in the set of chunks are self contained;

generating, by the system, a set of sample tables for respective chunks among the set of chunks based on sample tables associated with the video sample;

packing, by the system, respective chunks among the set of chunks and associated sample tables into subcontainers; and transmitting, by the system, respective subcontainers to a media sharing service separately.

10. The method of claim 9, wherein the parsing the video sample to determine the chunk boundaries is based on atoms of the video sample.

11. The method of claim 9, wherein the video sample is formatted using the MP4 format.

12. The method of claim 11, wherein the generating the set of sample tables for respective chunks by copying a set of byte ranges from a mdat atom associated with the video sample into a new mdat atom associated with at least one chunk.

13. The method of claim 12, wherein the respective byte offsets associated with the chunk boundaries is based on the sync sample table atom.

14. The method of claim 9, wherein the generating the set of sample tables for respective chunks by at least one of updating chunk offsets in a stco atom associated with the chunks or splitting the stco atom.

15. The method of claim 9, wherein the transmitting is at least two subcontainers simultaneously.

16. The method of claim 9, further comprising:

resending, by the system, a subcontainer upon receipt of a notice of failed subcontainer transmission associated with the subcontainer from the media sharing service.

17. A media sharing system comprising:

a memory that has stored thereon computer executable components; and a processor that executes the following computer executable components stored in the memory:

a receiving component that dynamically receives, from a device, video subcontainers among a set of video subcontainers, wherein the respective video subcontainers are received separately from each other, and respective chunks among a set of chunks and sample tables associated with the respective chunks are packed into the video subcontainers;

a transcoding component that dynamically transcodes respective video subcontainers among the set of video subcontainers upon receipt; and a display component that makes transcoded video subcontainers available for display, upon completion of transcoding.

18. The media sharing system of claim 17, further comprising:

a transmission error correction component that sends a notice of failed subcontainer transmission to the device upon a failure by the receiving component in dynamically receiving a video subcontainer among the set of video subcontainers.

19. The media sharing system of claim 18, wherein the receiving component reattempts receiving of the video subcontainer among the set of video subcontainers associated with the notice of failed subcontainer transmission.

20. The media sharing system of claim 17, wherein the transcoding component dynamically transcodes video subcontainers among the set of video subcontainers prior to receipt of all video subcontainers among the set of video subcontainers.

* * * * *